United States Patent [19]

Hayashi et al.

[11] Patent Number: 4,995,472

[45] Date of Patent: Feb. 26, 1991

[54] STEERING CONTROLLING DEVICE FOR WHEEL CRANE

[75] Inventors: Norihiko Hayashi; Tsuyoshi Katada, both of Kakogawa; Yukio Koizumi, Akashi, all of Japan

[73] Assignee: Kabushiki Kaisha Kobe Seiko Sho, Kobe, Japan

[21] Appl. No.: 437,740

[22] Filed: Nov. 17, 1989

[30] Foreign Application Priority Data

May 11, 1989 [JP] Japan .............................. 1-54626[U]

[51] Int. Cl.[5] ........................................ B60K 17/358
[52] U.S. Cl. ..................................... 180/234; 180/140
[58] Field of Search ................... 280/91; 180/140, 234

[56] References Cited

U.S. PATENT DOCUMENTS

| 3,185,245 | 5/1965 | Hoyt | 180/140 |
| 4,457,389 | 7/1984 | Voelz | 180/140 |
| 4,884,647 | 12/1989 | Mimuro et al. | 180/140 |
| 4,893,689 | 1/1990 | Laurich-Trost | 280/91 |
| 4,917,204 | 4/1990 | Andrew et al. | 180/140 |

FOREIGN PATENT DOCUMENTS 0049589 3/1988 Japan ..................................... 280/91

Primary Examiner—Charles A. Marmor
Assistant Examiner—Mitchell Bompey
Attorney, Agent, or Firm—Oblon, Spivak, McClelland, Maier & Neustadt

[57] ABSTRACT

A steering controlling device for a wheel crane wherein a locking operation in a special mode is permitted upon changing over from the special mode to a normal mode and locking and a mode changing over operation can be prevented during normal running of the crane. The device includes front and rear wheel steering cylinders, a mode changing over valve for controlling the cylinders to change over the steering mode, a mode selecting switch, a locking device for locking the rear wheels in the normal mode, a locking switch, a running detecting sensor for detecting a running condition of the crane, a locking change-over controller means responsive to signals from the locking switch and the running detecting sensor for developing a locking or unlocking instruction signal to the locking device when the crane is not in a normal running condition, and a mode change-over controller means responsive to a signal from the running detecting means for forwarding a steering mode selected by the mode selecting switch to the mode changing over valve when the crane is not in a normal running condition.

2 Claims, 5 Drawing Sheets

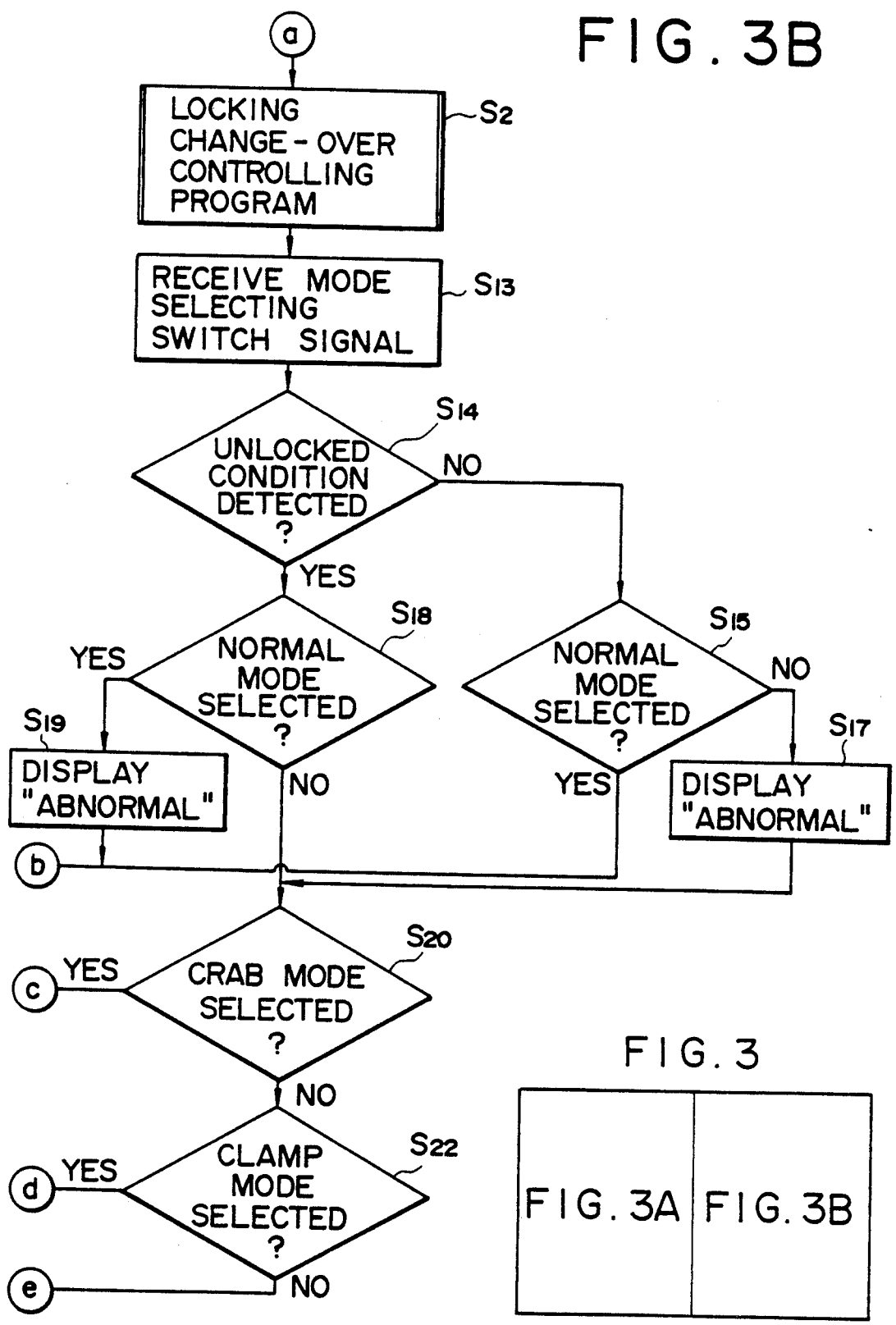

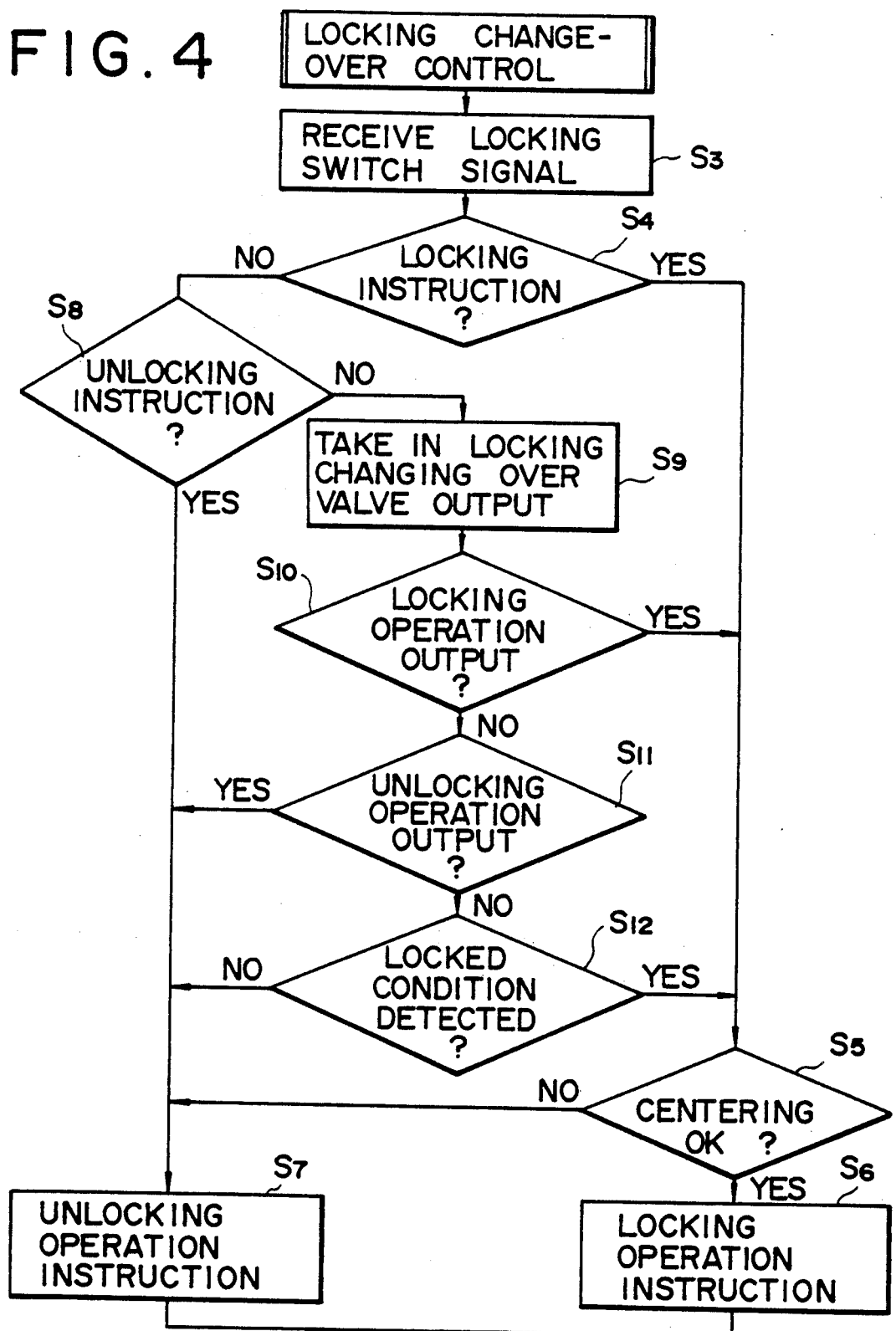

STEERING CONTROLLING DEVICE FOR WHEEL CRANE

BACKGROUND OF THE INVENTION

1. Field of the Invention

This invention relates to a steering controlling device for a wheel crane which can change over the steering mode between a normal steering mode (hereinafter referred to briefly as normal mode) wherein only the front wheels are steered and another special steering mode (hereinafter referred to briefly as special mode) wherein either both of the front wheels and the rear wheels or only the rear wheels are steered.

2. Description of the Related Art

A wheel crane operates, at a site of operation, in a special mode wherein either both of the front wheels and the rear wheels or only the rear wheels can be steered in order for the wheel crane to make a small turn to assure a good running condition at a narrow location, but upon running on a public way, it is changed over to a normal mode wherein only the front wheels can be steered for safety.

It is to be noted that the special mode may be a so-called crab mode wherein the front and rear wheels are steered in the same direction or a so-called clamp mode wherein the front wheels and the rear wheels are steered in the opposite directions or else a rear mode wherein only the rear wheels are steered.

Conventional steering controlling devices for effecting such changing over control of the steering mode are generally divided into two types. A steering controlling device of the first type is constituted such that a locking pin is operated in response to an operation of a mode selecting switch provided for selection of a steering mode. More particularly, when a normal mode is selected by the mode selecting switch, the rear wheels are automatically locked, but when a special mode is selected, the rear wheels are unlocked automatically. Such steering controlling device is disclosed, for example, in Japanese Utility Model Publication No. 62-5975.

A steering controlling device of the second type is constituted such that changing over to a special mode is permitted on condition that a locking switch for changing over between a locking position and an unlocking position is operated to the unlocking position.

However, with a steering controlling device of the construction of the first type described above, since the rear wheels can be locked only in the normal mode wherein the rear wheels cannot be steered when the locking pin is out of position with respect to a locking hole, it is impossible to move the rear wheels to make positioning between the locking pin and the locking hole. Accordingly, a procedure must be followed that the steering mode is first returned to a special mode, and then the rear wheels are moved suitably to roughly adjust the locked positions thereof, whereafter the steering mode is returned to the normal mode to try a locking operation again. Therefore, a locking operation is very cumbersome.

It is to be noted that, in order to cope with this, a so-called centering correcting mechanism is additionally provided which directs, upon locking, the rear wheels to the direction of running movement of the wheel crane, and a locking operation is effected on condition that centering has been completed, that is, the locking pin and the locking hole are adjusted in position relative to each other. However, a limit switch for detecting completion of such centering has some tolerance in detection, and an accurately centered condition may not always be attained. As a result accurate positioning is difficult.

On the other hand, also in the case of a steering controlling device of the construction of the second type, since the normal mode is automatically set when the locking switch is operated to the locking position to effect locking, it is impossible to move the rear wheels to effect positioning for locking similarly as in the steering controlling device of the first type.

Besides, the steering controlling devices of both of the first and second types are constituted such that locking and change-over control of the steering mode can be carried out whether the crane is in a normal running condition or in a stopping or low speed running condition. Accordingly, there is the possibility that locking or changing over of the steering mode may take place in response to an operation error during normal running of the crane so that a dangerous condition may take place.

SUMMARY OF THE INVENTION

It is an object of the present invention to provide a steering controlling device for a wheel crane wherein a locking operation in a special mode, that is, positioning for locking while the rear wheels are moved, is permitted upon changing over from the special mode to a normal mode.

It is another object of the present invention to provide a steering controlling device for a wheel crane wherein locking and a mode changing over operation can be prevented during normal running of the crane.

In order to attain the above objects, according to an aspect of the present invention, there is provided a steering controlling device for a wheel crane, which comprises a front wheel steering cylinder for steering front wheels of the wheel crane, a rear wheel steering cylinder for steering rear wheels of the wheel crane, a mode changing over valve for controlling operation of the front and rear wheel steering cylinders to change over the steering mode between a normal steering mode in which only the front wheels are steered and a special steering mode in which either both of the front and rear wheels or only the rear wheels are steered, a mode selecting switch for selecting a steering mode from the normal steering mode and the special steering mode, a locking device operable in the normal steering mode for locking the rear wheels from operation, a locking switch for selecting one of a locking operation and an unlocking operation of the locking device, a running detecting means for detecting whether the crane is either in a normal running condition or in a stopping or low speed running condition, a locking change-over controlling means operable in response to signals from the locking switch and the running detecting means for forwarding an instruction signal either for a locking operation or for an unlocking operation to the locking device when the crane is not in the normal running condition, and a mode change-over controlling means operable in response to a signal from the running detecting means for forwarding the steering mode selected by the mode selecting switch to the mode changing over valve only when the crane is not in the normal running condition.

With the mode changing over controlling device, in a stopping condition or a low speed running condition of the crane, locking changing over control (locking or unlocking) by the locking change-over controlling means and selection of a steering mode by the mode change-over controlling section can be performed independently of each other. Accordingly, since it is possible to select a special mode and perform a locking operation while moving the rear wheels, positioning for locking can be facilitated.

Further, since locking and changing over control of the steering mode can be effected on condition that the crane is not in a normal running condition, that is, the crane is in a stopping condition or in a low speed running condition in which there is little possibility that a dangerous situation may be invited by locking or changing over of the steering mode, even if locking or a changing over operation of the steering mode is instructed in error during normal running of the crane, locking or a changing over operation is not effected, and the current conditions are maintained. Consequently, the safety of running can be assured.

However, with the construction of the mode changing over controlling device, there is the possibility that, after the rear wheels are brought into a locked condition as described above, changing over to the normal mode may be forgotten and the crane may run while remaining in a special mode. If this actually happens, there is the possibility that the rear wheels may be steered and the locking device may be damaged during normal running of the crane. The possibility is eliminated with a mode changing over controlling device according to another aspect of the present invention.

According to another aspect of the present invention, there is provided a steering controlling device for a wheel crane, which comprises a front wheel steering cylinder for steering front wheels of the wheel crane, a rear wheel steering cylinder for steering rear wheels of the wheel crane, a mode changing over valve for controlling operation of the front and rear wheel steering cylinders to change over the steering mode between a normal steering mode in which only the front wheels are steered and a special steering mode in which either both of the front and rear wheels or only the rear wheels are steered, a mode selecting switch for selecting a steering mode from the normal steering mode and the special steering mode, a locking device operable in the normal steering mode for locking the rear wheels from operation, a locking switch for selecting one of a locking operation and an unlocking operation of the locking device, a locking detecting means for detecting whether the locking device is in a locking condition or in an unlocking condition, a running detecting means for detecting whether the crane is either in a normal running condition or in a stopping or low speed running condition, a locking change-over controlling means responsive to signals from the locking switch and the running detecting means for forwarding an instruction signal either for a locking operation or for an unlocking operation to the locking device when the crane is not in the normal running condition, and a mode change-over controlling means operable in response to a signal from the running detecting means forwarding the steering mode selected by the mode selecting switch to the mode changing over valve only when the crane is not in the normal running condition and also operable, when a detection signal of the normal running condition from the running detecting means and a detection signal of an unlocked condition of the rear wheels from the locking detecting means are received, for normally forwarding an instruction signal of the normal steering mode to the mode changing over valve.

With the mode changing over controlling device, when the crane enters normal running while the rear wheels remain in a locked condition, the steering mode is changed over to the normal mode. Consequently, running of the wheel crane in an abnormal combination of a special mode and a locked condition can be prevented. Accordingly, occurrence of a dangerous situation that the rear wheels may be steered during normal running of the wheel crane to cause damage to the locking device can be prevented.

The above and other objects, features and advantages of the present invention will become apparent from the following description and the appended claims, taken in conjunction with the accompanying drawings.

BRIEF DESCRIPTION OF THE DRAWINGS

FIGS. 3 and 4 are flow charts illustrating operation of the steering controlling device of FIG. 1.

DETAILED DESCRIPTION OF THE PREFERRED EMBODIMENT

Figure 1:
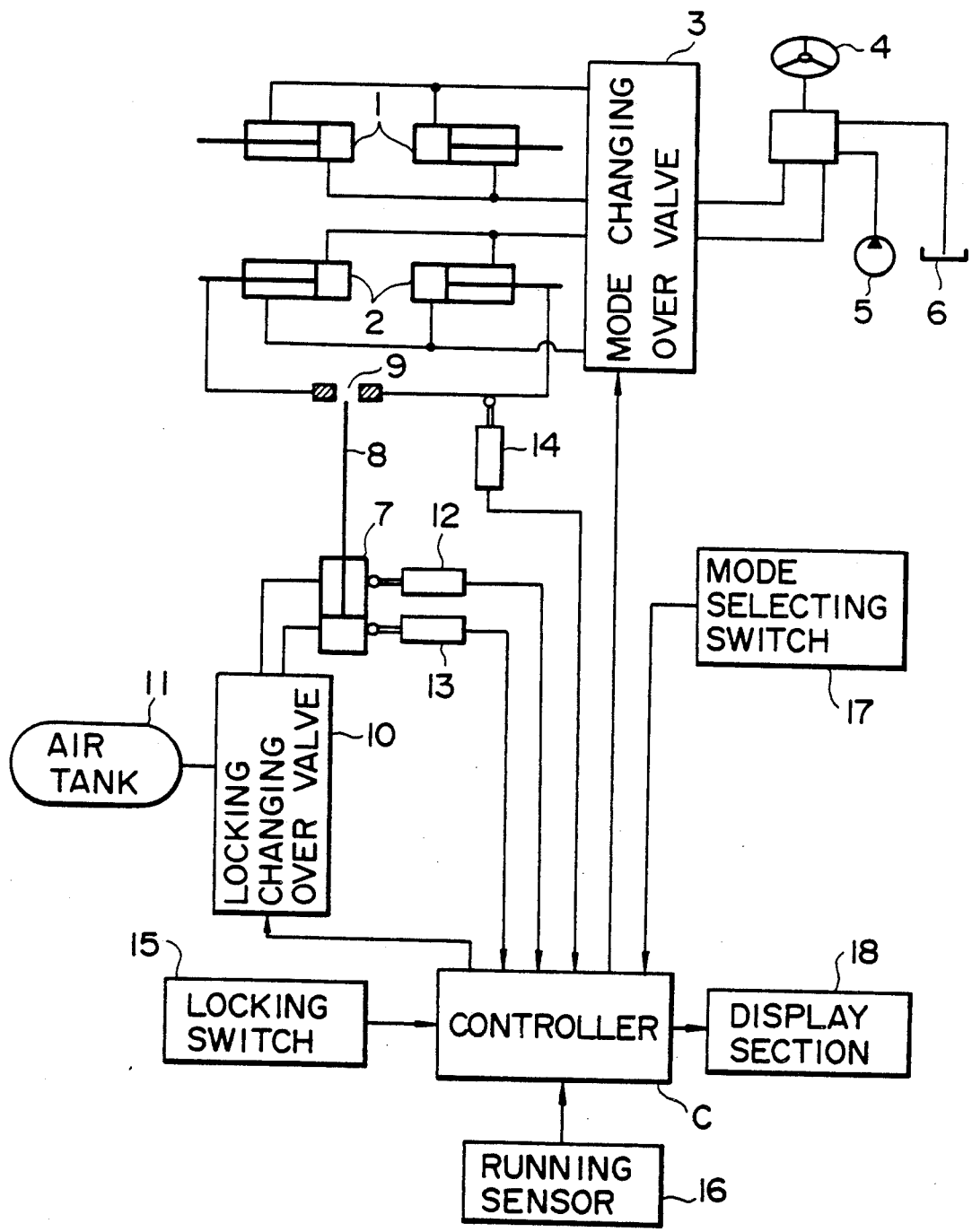
FIG. 1 is a block diagram of an entire steering controlling device showing an embodiment of the present invention.

Referring first to FIG. 1, there is shown an entire steering controlling device for a wheel crane according to the present invention. The steering controlling device shown includes a pair of front wheel steering cylinders 1 for steering the left and right front wheels (not shown) of the wheel crane, and a pair of rear wheel steering cylinders 2 for steering the left and right rear wheels (not shown) of the wheel crane. The steering controlling device further includes a mode changing over valve (mode change-over valve) 3 consisting of a plurality of hydraulic electromagnetic change-over valves for controlling supply and discharge of pressure oil into and from the steering cylinders 1 and 2. By a changing over operation of the mode changing over valve 3, the steering mode is changed over between a normal mode and a special mode (either one of crab, clamp and rear modes). It is to be noted that detailed illustration and description of the mode changing over valve 3 are omitted herein because construction and operation of the mode changing over valve 3 are already known. The steering controlling device further includes a steering wheel 4, a hydraulic pump 5 and a tank 6.

The steering controlling device further includes a locking cylinder 7 of the pneumatic type, and a locking pin 8 connected to be driven to expand or contract by the locking cylinder 7. When the locking cylinder 7 is expanded, the locking pin 8 is inserted into a locking hole 9 on the rear wheel side to lock the rear wheels, but when the locking cylinder 7 is contracted, the locking pin 8 is pulled out of the locking hole 9 to unlock the rear wheels. The steering controlling device further includes an electromagnetic locking changing over valve 10 for controlling expanding and contracting movement of the locking cylinder 7, and an air tank 11 serving as a pneumatic pressure supply source for the locking cylinder 7. A locking device is thus constituted from the locking pin 8, locking hole 9, locking changing over valve 10 and air tank 11.

The steering controlling device further includes a locked condition detecting switch 12 of a locking detecting means, and an unlocked condition detecting switch 13 of the locking detecting means. The detecting switches 12 and 13 may be limit switches and detect a locked condition and an unlocked condition of the rear wheels, respectively, from a movement of the locking cylinder 7. The steering controlling device further includes a centering detecting switch 14 in the form of a limit switch for detecting whether the rear wheels are directed in a parallel condition to the direction of rectilinear running movement of the crane. The centering detecting switch 14 is turned on when it detects such parallel condition (centered condition) of the rear wheels.

Figure 2:
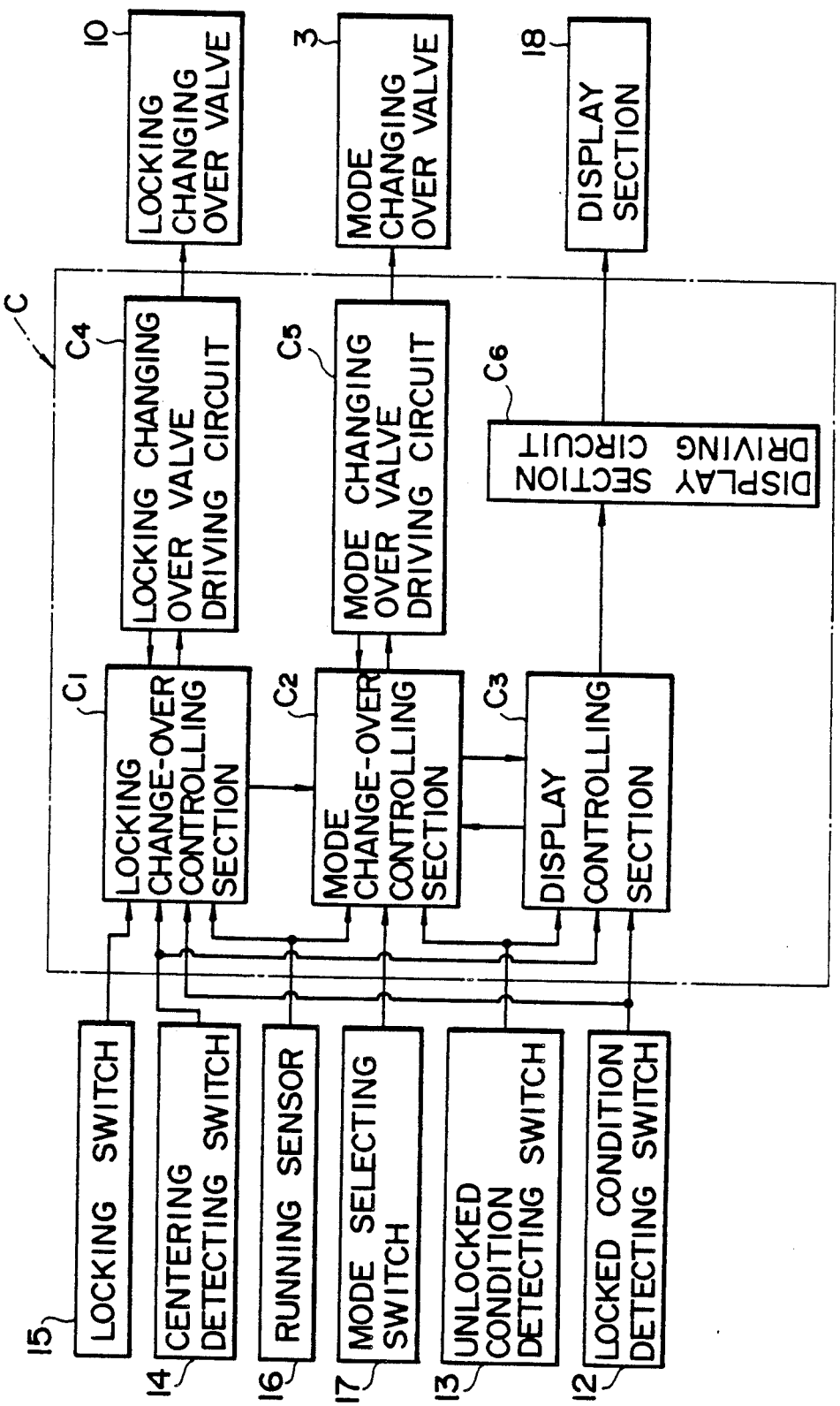
FIG. 2 is a block diagram showing a controller and associated components of the steering controlling device shown in FIG. 1.

Detection signals from the detecting switches 12, 13 and 14 are inputted to a controller C. Construction of the controller C and construction for inputting and outputting to and from the controller C will be described below with additional reference to FIG. 2.

The controller C includes a locking change-over controlling section $C_1$, a mode change-over controlling section $C_2$, a display controlling section $C_3$, a locking changing over valve driving circuit $C_4$, a mode changing over valve driving circuit $C_5$ and a display section driving circuit $C_6$.

The locking change-over controlling section $C_1$ is connected to receive a detection signal from the centering detecting switch 14, a locking or unlocking instruction signal from the locking switch 15 for selection of locking or unlocking of the rear wheels, a signal from a running sensor 16 and a signal from the locked condition detecting switch 12. The locking change-over controlling section $C_1$ is also connected to receive a feedback signal which is outputted therefrom to the locking changing over valve 10. In response to such input signals thus received, the locking change-over controlling section $C_1$ outputs a locking or unlocking operation instruction signal to the locking changing over valve 10 by way of the locking changing over valve driving circuit $C_4$.

The running sensor 16 detects from the running speed of the crane whether the crane is in a normal running condition or some other running condition (a stopping condition or a low speed running condition) wherein there is little possibility that a dangerous condition may be invited even if locking or a changing over operation of the mode is performed. Then, when the running speed of the crane is higher, for example, 10 km/h, the running sensor 16 outputs a normal running signal.

Meanwhile, the mode changing over controlling section $C_2$ is connected to receive, in addition to a signal from the running sensor 16, a mode selecting signal from the mode selecting switch 17 which is provided for selection of a steering mode from among a normal mode and three special modes, and an unlocking signal from the unlocked condition detecting switch 13 and is also connected to receive a feedback signal which is outputted therefrom to the mode changing over valve 3. In response to those signals received, the mode change-over controlling section $C_2$ outputs a mode instruction signal to the mode changing over valve 3 by way of the mode changing over valve driving circuit $C_5$.

On the other hand, the display controlling section $C_3$ is connected to selectively receive signals from the locked condition detecting switch 12 and the unlocked condition detecting switch 13 and is also connected to transmit and receive signals to and from the mode change-over controlling section $C_2$. An instruction signal from the display controlling section $C_3$ is inputted to the display section driving circuit $C_6$ to control the display section 18.

The display section 18 includes a plurality of indication lamps so that a steering mode, a locking condition (in a locked condition or an unlocked condition) and a centering condition may be indicated by those lamps.

Further, the display section 18 is provided with an alarm device (not shown). When a combination of a steering mode and a locking condition is not appropriate, an indication of this is provided by the alarm device.

Details of operation of the device including control by the controller C will be described with reference to the flow charts shown in FIGS. 3 and 4.

Figure 3A:
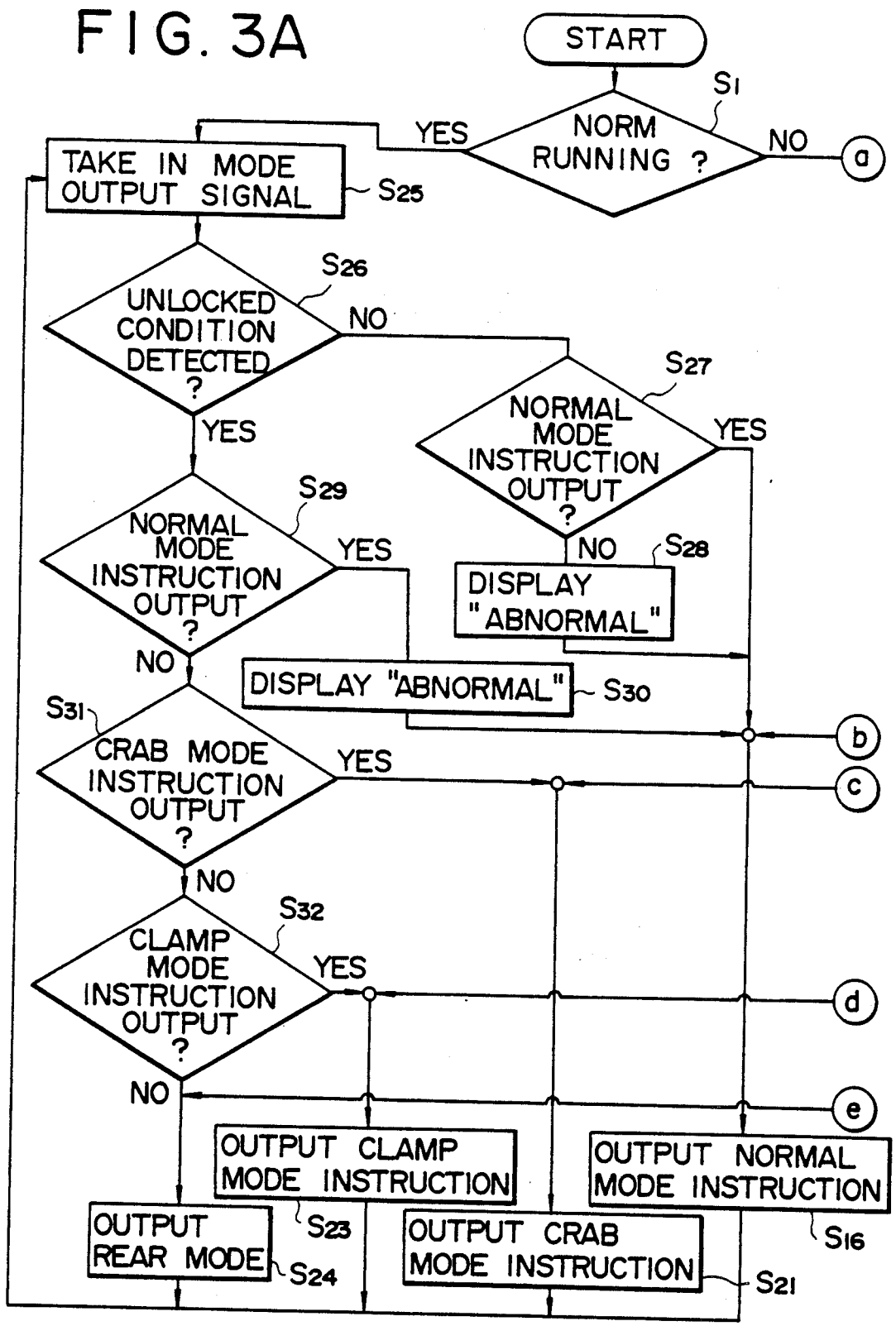

Referring first to FIG. 3, after starting of control of the device, at first at step $S_1$, it is judged in accordance with a detection signal from the running sensor 16 whether the crane is either in a normal running condition or in some other running condition (that is, in a stopping condition or in a low speed running condition: such conditions will be hereinafter referred to collectively as a stopping condition). In case the crane is in a stopping condition, a locking change-over controlling program of FIG. 4 is executed at step $S_2$ of FIG. 3B as a first stage of stopping control. In particular, locking control is executed only when the crane is in a stopping condition.

I. Control during Stopping

In the locking change-over controlling program, an instruction signal of the locking switch 15 is taken in at first at step $S_3$, and then at step $S_4$, it is judged whether the instruction from the locking switch 15 is a locking instruction or an unlocking instruction. In the case of a locking instruction, it is judged, at step $S_5$, in accordance with a detection signal from the centering detecting switch 14 whether centering is allowed. In case centering is allowed, a locking operation instruction signal is outputted, at step $S_6$, from the locking change-over controlling section $C_1$ to the locking change-over valve 10 by way of the locking change-over valve driving circuit $C_4$.

Consequently, the locking cylinder 7 is rendered operative to expand itself so that the locking pin 8 is fitted into the locking hole 9 thereby to lock the rear wheels from rotation.

It is to be noted that, when the rear wheels are not in a centering condition, this means that the locking pin 8 and the locking hole 9 are out of position from each other, and accordingly, a locking operation should not be carried out. Accordingly, the sequence advances from step $S_5$ to step $S_7$ at which an unlocking instruction signal is outputted from the locking switch 15.

On the other hand, in case it is judged at step $S_4$ that the instruction signal from the locking switch 15 is an unlocking signal, the sequence advances by way of step $S_8$ to step $S_7$ at which an unlocking instruction signal is outputted similarly as described above.

However, in case it is judged at step $S_8$ that the instruction signal is not an unlocking signal after it has not been judged at step $S_4$ that the instruction signal is a locking signal, then an output signal to the locking change-over valve 10 is taken in at step $S_9$, and then it is judged at step $S_{10}$ whether or not the output signal is a locking operation output. In case the output signal is a locking operation output, the sequence advances to step $S_5$. On the other hand, if the output signal is not a locking operation output, then it is judged at step $S_{11}$ whether the output signal is an unlocking operation output. In case the judgment is in the affirmative, the sequence naturally advances to step $S_7$. On the contrary, if the judgment is in the negative, then the output signal is compared with a signal from the locking condition detecting switch 12 at step $S_{12}$. Then, in case a locked condition is not detected, the sequence advances to step $S_7$, but on the contrary if a locked condition is detected, then the sequence advances to step $S_5$.

After the locking change-over controlling program is completed in this manner, a switch signal or mode selection signal from the mode selecting switch 17 is taken in at step $S_{13}$ shown in FIG. 3B. After that, it is judged in accordance with a signal from the unlocked condition detecting switch 13, at step $S_{14}$, whether or not an unlocked condition is detected. If the judgment here is in the negative, that is, if an unlocked condition is not detected, then it is detected at step $S_{15}$ whether or not the normal mode is selected. In case the judgment is in the affirmative, a normal mode instruction signal is outputted to the mode changing over valve controlling section $C_5$ at step $S_{16}$.

On the other hand, if the judgment at step $S_{15}$ is in the negative and hence the normal mode is not selected, then as an abnormal combination is thus determined that the crane is neither in an unlocked condition nor in the normal mode, that is, the crane is in a locked condition and in a special mode, an abnormal display instruction signal is delivered, at step $S_{17}$, from the display controlling section $C_3$ to the display section driving circuit $C_6$. Consequently, the alarm device is operated by the display section 18, and the display lamp for a locked condition is caused to blink to indicate that an abnormal condition has taken place.

In the meantime, in case the judgment at step $S_{14}$ is in the affirmative, that is, an unlocked condition is detected, it is further judged at step $S_{18}$ whether or not the normal mode is selected. In case the judgment is in the affirmative, this signifies an abnormal combination of an unlocked condition and the normal mode, and accordingly, a display of the abnormal condition is provided at step $S_{19}$ similarly as at step $S_{17}$, whereafter a normal mode instruction signal is outputted at step $S_{16}$.

Meanwhile, after such abnormal display is provided at step $S_{17}$ or when it is judged at step $S_{18}$ that the normal mode is not selected, it is judged at step $S_{20}$ whether or not the steering mode is the crab mode. In case the judgment is in the affirmative, a crab mode instruction signal is outputted to the mode changing over valve driving circuit $C_5$ at step $S_{21}$. On the contrary, if the judgment at step $S_{20}$ is in the negative, then it is judged at step $S_{22}$ whether or not the mode is the clamp mode, and in case the judgment is in the affirmative, a clamp mode instruction signal is outputted at step $S_{23}$, but on the contrary if the judgment is in the negative, then a rear mode instruction is outputted at step $S_{24}$.

II. Control during Normal Running

If it is judged at step $S_1$ in FIG. 3 that the crane is in a normal running condition, at first a signal (mode output signal) which is actually being outputted to the mode change-over valve 3 is taken in.

After then, at step $S_{26}$, it is judged in accordance with a signal from the unlocked condition detecting switch 13 whether or not an unlocked condition is detected. If the judgment is in the negative, then it is judged at step $S_{27}$ whether or not a normal mode instruction signal is outputted, and in the case of the affirmative judgement, the sequence advances to step $S_{16}$ at which a normal mode instruction signal is outputted. On the contrary, in case the judgment is in the negative, since the crane is not in an unlocked condition and is not in the normal mode, that is, since the crane is in a locked condition and in a special mode, it is determined that they make an abnormal combination, and consequently, an indication of abnormality is provided at step $S_{28}$ similarly as at step $S_{17}$ or $S_{19}$ in the stopping control. After then, a normal mode instruction signal is outputted compulsorily at step $S_{16}$.

On the other hand, in case the judgment at step $S_{26}$ is in the positive and the crane is in an unlocked condition, it is judged at step $S_{30}$ whether or not a normal mode instruction is being outputted, and in case a normal mode instruction signal is being outputted, also an abnormal combination of an unlocked condition and the normal mode is determined. Also here, an indication of abnormality is provided at step $S_{28}$.

On the contrary, if the judgment at step $S_{29}$ is in the negative, then the sequence either advances by way of step $S_{31}$ to steps 21 at which a crab mode instruction signal is outputted or advances from step $S_{31}$ further by way of step $S_{32}$ to step $S_{23}$ at which a clamp mode instruction signal is outputted or to step $S_{24}$ at which a rear mode instruction signal is outputted.

As described above, with the steering controlling device, the locking changing over control can be executed independently of a steering mode in a stopping condition of the crane. In particular, eliminating a conventional concept that a normal mode is a requirement for a locking operation such that a locking operation cannot be performed unless the steering mode is a normal mode (Japanese Utility Model Publication No. 62-5975) or the steering mode is automatically set to a normal mode if a locking switch is operated in the locking direction, locking changing is operated in the locking direction, locking changing over control (insertion and removal of the locking pin 8) can be executed in either steering mode of a normal mode and a special mode. Consequently, a locking operation can be performed in a special mode in which such locking operation cannot be executed in a conventional device. Accordingly, when the locking pin 8 and the locking hole 9 are out of position from each other, a locking operation can be performed while moving the rear wheels, and accordingly, a locking operation can be simplified very much.

On the other hand, if it is judged at step $S_{26}$ of FIG. 3 during normal running of the crane that the crane is not in an unlocked condition, it is regarded that the crane is in a locked condition and normally a normal mode instruction signal is outputted irrespective of the steering mode (steps $S_{27}$, $S_{28}$ and $S_{16}$).

Accordingly, even if changing over to the normal mode is erroneously not performed after a locking operation in a special mode, the steering mode can be automatically changed over to the normal mode. Consequently, occurrence of such an abnormal condition that, while the rear wheels are held in a locked condition, the crane is driven to run in a special mode and the rear wheels are steered during such running so that the locking device (locking pin 8 and so forth) may be damaged, can be prevented with certainty.

Further, when an abnormal combination of the steering mode and the locking condition, that is, a locked condition and a special mode or an unlocked condition and the normal mode, takes place during normal running or during stopping, an operator is informed of the abnormal condition by way of a display of the display section 18. Consequently, occurrence of a dangerous situation such as possible damage to the locking device or snaking during running on a public way can be prevented.

Meanwhile, since locking and changing over control of the mode can be achieved only in a stopping condition (including a low speed running condition) of the crane as seen from the flow chart of FIG. 3, even if manual operation for locking or changing over of the steering mode is performed, such locking or changing over is not accomplished actually but the current locking condition and the current steering mode are maintained. Consequently, the safety in running can be assured.

By the way, the locking cylinder 7 is not limited to such an air cylinder as included in the embodiment described above but may otherwise be a hydraulic cylinder. Further, the locked condition detecting switch 12, unlocked condition detecting switch 13 and centering detecting switch 14 may be some other switches or sensors than limit switches, such as optical sensors or contactless switches.

Having now fully described the invention, it will be apparent to one of ordinary skill in the art that many changes and modifications can be made thereto without departing from the spirit and scope of the invention as set forth herein.

What is claimed:

1. A steering controlling device for a wheel crane, comprising a front wheel steering cylinder for steering front wheels of said wheel crane, a rear wheel steering cylinder for steering rear wheels of said wheel crane, a mode changing over valve for controlling operation of said front and rear wheel steering cylinders and comprising means to change over a steering mode between a normal steering mode in which only said front wheels are steered and a special steering mode in which at least said rear wheels are steered, a mode selecting switch for selecting one of the normal steering mode and the special steering mode, a locking device comprising means for locking said rear wheels from operation in the normal steering mode, a locking switch comprising means for selecting one of a locking operation and an unlocking operation of said locking device, a running detecting means for detecting which one of a normal running condition and a stopping or a low speed running condition said crane is in, a locking change-over controlling means operable in response to a signal from said locking switch and to a signal from said running detecting means that the crane is only in a stopping or a low speed running condition for forwarding an instruction signal for one of a locking operation and an unlocking operation to said locking device when said crane is not in the normal running condition, and a mode change-over controlling means responsive to a signal from said running detecting means for forwarding a steering mode selected by said mode selecting switch to said mode changing over valve only when said crane is not in the normal running condition.

2. A steering controlling device for a wheel crane, comprising a front wheel steering cylinder for steering front wheels of said wheel crane, a rear wheel steering cylinder for steering rear wheels of said wheel crane, a mode changing over valve for controlling operation of said front and rear wheel steering cylinder and comprising means to change over a steering mode between a normal steering mode in which only said front wheels are steered and a special steering modem in which at least said rear wheels are steered, a mode selecting switch for selecting one of the normal steering mode and the special steering mode, a locking device comprising means for locking said rear wheels from operation in the normal steering mode, a locking switch comprising means for selecting one of a locking operation and an unlocking operation of said locking device, a locking detecting means for detecting whether said locking device is in a locking condition or in an unlocking condition, a running detecting means for detecting which one of a normal running condition and a stopping or a low speed running condition said crane is in, a locking change-over controlling means operable in response to a signal from said locking switch and to a signal from said running detecting means that the crane is only in a stopping or a low speed running condition for forwarding an instruction signal for one of a locking operation and an unlocking operation to said locking device when said crane is not in the normal running condition, and a mode change-over controlling means responsive to a signal from said running detecting means for forwarding a steering mode selected by said mode selecting switch to said mode changing over valve only when said crane is not in the normal running condition and also responsive to said signal from said running detecting means for forwarding a normal steering instruction signal to said mode change-over valve when a normal running detection signal is received from said running detecting means and a locked condition signal of said rear wheels is received from said locking detecting means.

* * * * *